United States Patent
Palla et al.

(10) Patent No.: US 9,699,967 B2
(45) Date of Patent: Jul. 11, 2017

(54) CROSSWIND COMPENSATION FOR RESIDUE PROCESSING

(71) Applicant: Deere & Company, Moline, IL (US)

(72) Inventors: Bhanu Kiran Reddy Palla, Bettendorf, IA (US); John M. Hageman, Bettendorf, IA (US)

(73) Assignee: Deere & Company, Moline, IL (US)

( * ) Notice: Subject to any disclaimer, the term of this patent is extended or adjusted under 35 U.S.C. 154(b) by 143 days.

(21) Appl. No.: 14/866,290

(22) Filed: Sep. 25, 2015

(65) Prior Publication Data

US 2017/0086372 A1   Mar. 30, 2017

(51) Int. Cl.
| | | |
|---|---|---|
| G06F 19/00 | (2011.01) | |
| A01D 41/127 | (2006.01) | |
| G01P 5/02 | (2006.01) | |
| G01P 13/02 | (2006.01) | |

(52) U.S. Cl.
CPC .............. *A01D 41/127* (2013.01); *G01P 5/02* (2013.01); *G01P 13/02* (2013.01)

(58) Field of Classification Search
CPC .......... A01D 41/127; G01P 5/02; G01P 13/02
See application file for complete search history.

(56) References Cited

U.S. PATENT DOCUMENTS

| | | | |
|---|---|---|---|
| 5,569,081 A | 10/1996 | Baumgarten et al. | |
| 5,995,895 A | 11/1999 | Watt et al. | |
| 2008/0150292 A1* | 6/2008 | Fedor | F03D 1/04 290/55 |
| 2009/0256359 A1* | 10/2009 | Bruk | F03D 1/02 290/55 |
| 2010/0013233 A1* | 1/2010 | Buhtz | F03D 3/00 290/55 |
| 2011/0156392 A1* | 6/2011 | Thacker, II | F03D 3/0472 290/44 |
| 2013/0095899 A1 | 4/2013 | Knapp | |
| 2014/0301607 A1 | 10/2014 | Anderson et al. | |
| 2014/0377066 A1* | 12/2014 | Anderson | F03D 1/065 416/44 |
| 2015/0108758 A1* | 4/2015 | Oakes | F03D 3/0427 290/52 |
| 2015/0361961 A1* | 12/2015 | Chacon | F03D 11/00 415/108 |

* cited by examiner

*Primary Examiner* — Ian Jen
(74) *Attorney, Agent, or Firm* — Joseph R. Kelly; Kelly, Holt & Christenson PLLC

(57) ABSTRACT

A wind speed sensor includes a shroud that is elongate along a longitudinal axis that is generally transverse to a direction of travel of a mobile machine to which it is mounted. The wind speed sensor senses a magnitude of a crosswind component. An action signal is generated based upon the crosswind component sensed by the wind speed sensor. The action signal can be used to control a direction of residue discharge from the mobile machine.

20 Claims, 12 Drawing Sheets

CROSSWIND COMPENSATION FOR RESIDUE PROCESSING

FIELD OF THE DESCRIPTION

The present description relates to processing residue using a mobile machine. More specifically, the present description relates to compensating residue discharge processing for crosswind.

BACKGROUND

There are many different types of mobile machines that process various forms of residue. Such mobile machines can include agricultural machines, construction machines, machines used in forestry and turf applications, among others.

One example of such a machine is a harvesting machine, such as a combine. The combine travels across a field and engages crop to be processed. The crop is then processed and residue is generated. The residue is, at some point, discharged from the combine. It can be chopped, dropped in a windrow, or discharged in other ways.

Some combines allow the operator to control the spread width of the residue that is discharged from the combine. In one example, the operator can do this by individually controlling the speed of a left and right spreader mechanism. In other examples, directional shrouds or baffles are provided, and the operator can control the direction of discharge of the residue, by controlling the shrouds or baffles, or other orientation mechanisms that orient the spreaders in different directions.

The discussion above is merely provided for general background information and is not intended to be used as an aid in determining the scope of the claimed subject matter.

SUMMARY

A wind sensor includes a shroud that is elongate along a longitudinal axis. The axis is generally transverse to a direction of travel of a mobile machine to which it is mounted. The wind sensor senses a magnitude of a crosswind component. An action signal is generated based upon the crosswind component sensed by the wind sensor. The action signal can be used to control a direction of residue discharge from the mobile machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are a wide variety of different types of machines that process material and generate and discharge residue. Discharging the residue can be affected by crosswinds. As one example, as a combine moves through a field in a direction of travel, the crosswinds can be in a direction generally transverse to the direction of travel of the combine (or at least have a component in that direction).

As the combine travels through the field, it discharges residue. When residue distribution is even, or uniform, it evenly replaces nutrients from the material other than grain that is discharged, as residue, to the soil. Where crosswinds are present, so that the residue is not evenly discharged, this can be detrimental. It can result in uneven or non-uniform distribution of the nutrients back to the field. Also, when crosswinds are present, the material other than grain can be discharged from the combine and blown into the standing crop that has yet to be harvested, adjacent the combine. This can cause the combine to waste energy that will be consumed by reprocessing this material in a later pass.

Some combines allow operators to control the spread width of residue discharge from the machine by individually controlling the speed of left and right spreaders on the combine or by controlling directional shrouds or baffles that direct the residue discharge. Even though these types of combines allow the operator to vary the set point used to control the discharge mechanism (and hence vary the direction of distribution of residue that is discharged from the machine), this can be very difficult. For an operator to control the distribution of the residue discharged from the combine, based on a crosswind, the operator may need to substantially continuously monitor the wind speed and adjust the spreader speeds (or shroud position(s)) to accommodate for the crosswind. This can be cumbersome and time consuming.

Figure 1:
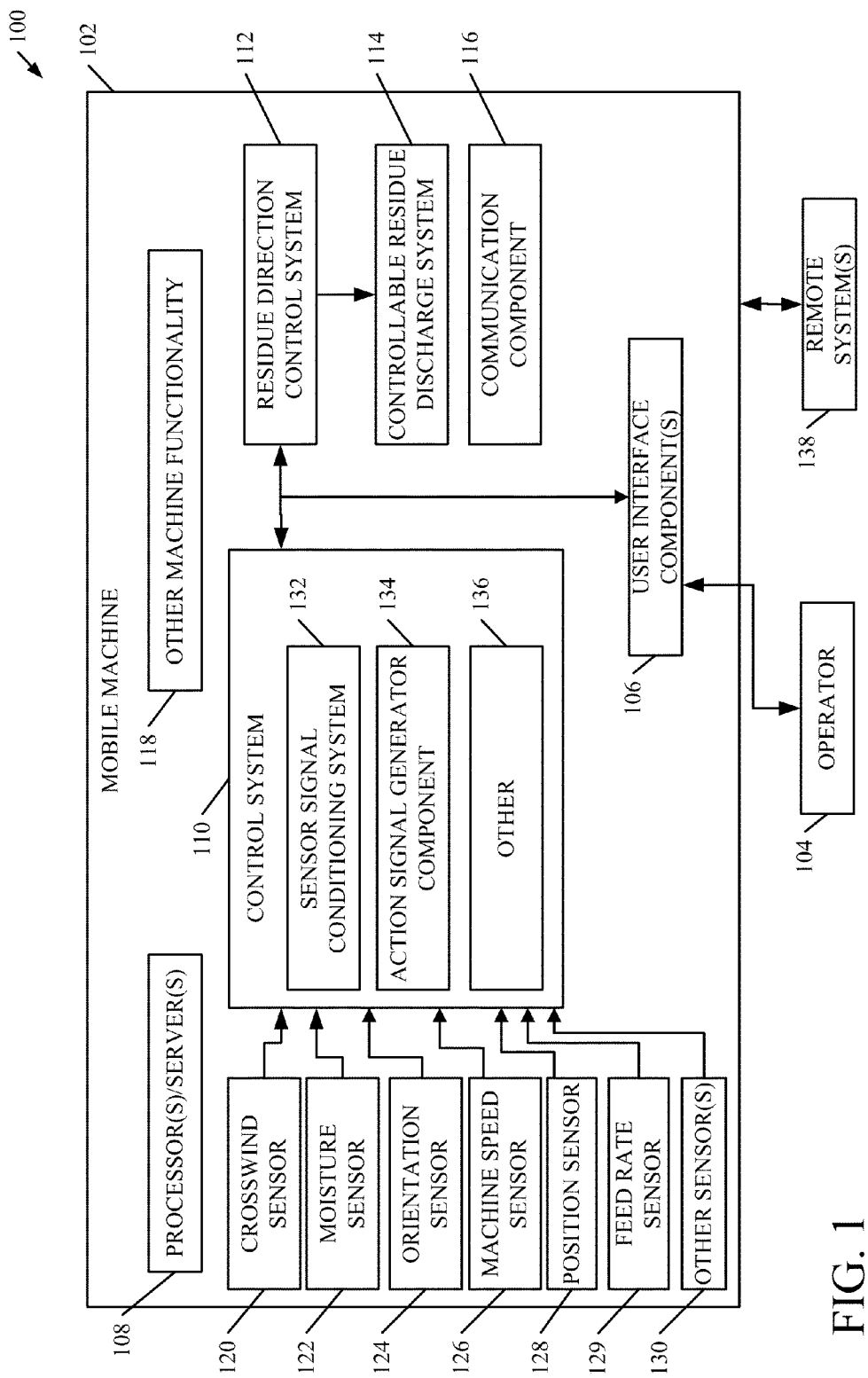
FIG. 1 is a block diagram of one example of a mobile machine architecture that can be used to compensate residue discharge based on sensed crosswind.

FIG. 1 is a block diagram of one example of a mobile machine architecture 100 that senses crosswind and compensates residue handling operations based on the sensed crosswind. In the example shown in FIG. 1, mobile machine architecture 100 includes mobile machine 102 that is operated by an operator 104. The operator 104 can interact with a variety of different user interface components 106 in order to control and manipulate mobile machine 102.

In the example shown, mobile machine 102 illustratively includes one or more servers or processors 108, control system 110, residue direction control system 112, controllable residue discharge system 114, communication component 116, and it can include a wide variety of other machine functionality 118. FIG. 1 also shows that, in one example, control system 110 receives inputs from crosswind sensor 120 and it can also receive inputs from a variety of other sensors. For instance, it can receive inputs from moisture sensor 122, orientation sensor 124, machine speed sensor 126, position sensor 128, feed rate sensor 129, and it can include an input from a wide variety of other sensors 130 as well. For instance, the sensors may sense other physical characteristics of the residue, such as its size, volume, discharge rate, etc. Control system 110, itself, illustratively includes sensor signal conditioning system 132, action signal generator component 134, and it can include other items 136. FIG. 1 also shows that, in one example, communication component 116 in mobile machine 102 can communicate with remote systems 138. This can be done directly, over a network, or in a wide variety of other ways, some of which are described in more detail below.

A brief overview of the operation of mobile machine 102, and some of the items in mobile machine 102, will now be described. Control system 110 illustratively receives a sensor signal from crosswind sensor 120. The sensor signal can be provided to sensor signal conditioning system 132. System 132 can illustratively perform various types of signal conditioning on the sensor signal, such as amplification, linearization, compensation, normalization, etc. Action signal generator component 134 is described in more detail with respect to FIG. 5 below. Briefly, however, it illustratively receives the crosswind sensor signal and generates an action signal based upon the crosswind sensed. It can provide the action signal to residue direction control system 112 to control the direction of residue discharge from machine 102, based on the crosswind. It can also provide the action signal (or another action signal) to user interface component 106 so that the information can be surfaced for operator 104. One example of this is described in greater detail below with respect to FIG. 7. Residue direction control system 112 illustratively generates a control signal and provides it to controllable residue discharge system 114 to control the direction of discharge of the residue generated by machine 102, based upon the crosswind sensed by sensor 120.

It will also be noted that, in one example, control system 110 receives other sensor signals from the other sensors. Such sensors sense variables that may have an impact on the direction of discharge of the residue. For instance, moisture sensor 122 can sense the moisture of the residue. If the residue has higher moisture, it may be heavier and may therefore be less affected by crosswinds. Thus, control system 110 can consider the residue moisture level indicated by moisture sensor 122 as well.

In addition, it may be that mobile machine 102 is operating on a side hill, in which case the residue may tend to be discharged preferentially in one direction, based upon the orientation of machine 102. Therefore, system 110 can receive an orientation sensor signal from sensor 124, and can thus consider the orientation of mobile machine 102 in controlling the direction of residue discharge.

Further, the residue discharge may be affected by the speed of travel of mobile machine 102, or by its position, or by the amount of residue currently being discharged, or by other variables. In that case, system 110 can receive a machine speed sensor signal from sensor 126, a position sensor signal from sensor 128, a feed rate sensor signal (which may be indicative of the amount of residue being discharged) from sensor 129, and a variety of other sensor signals from other sensors 130, and consider those sensed variables in controlling the direction of residue discharge as well.

Figure 2:
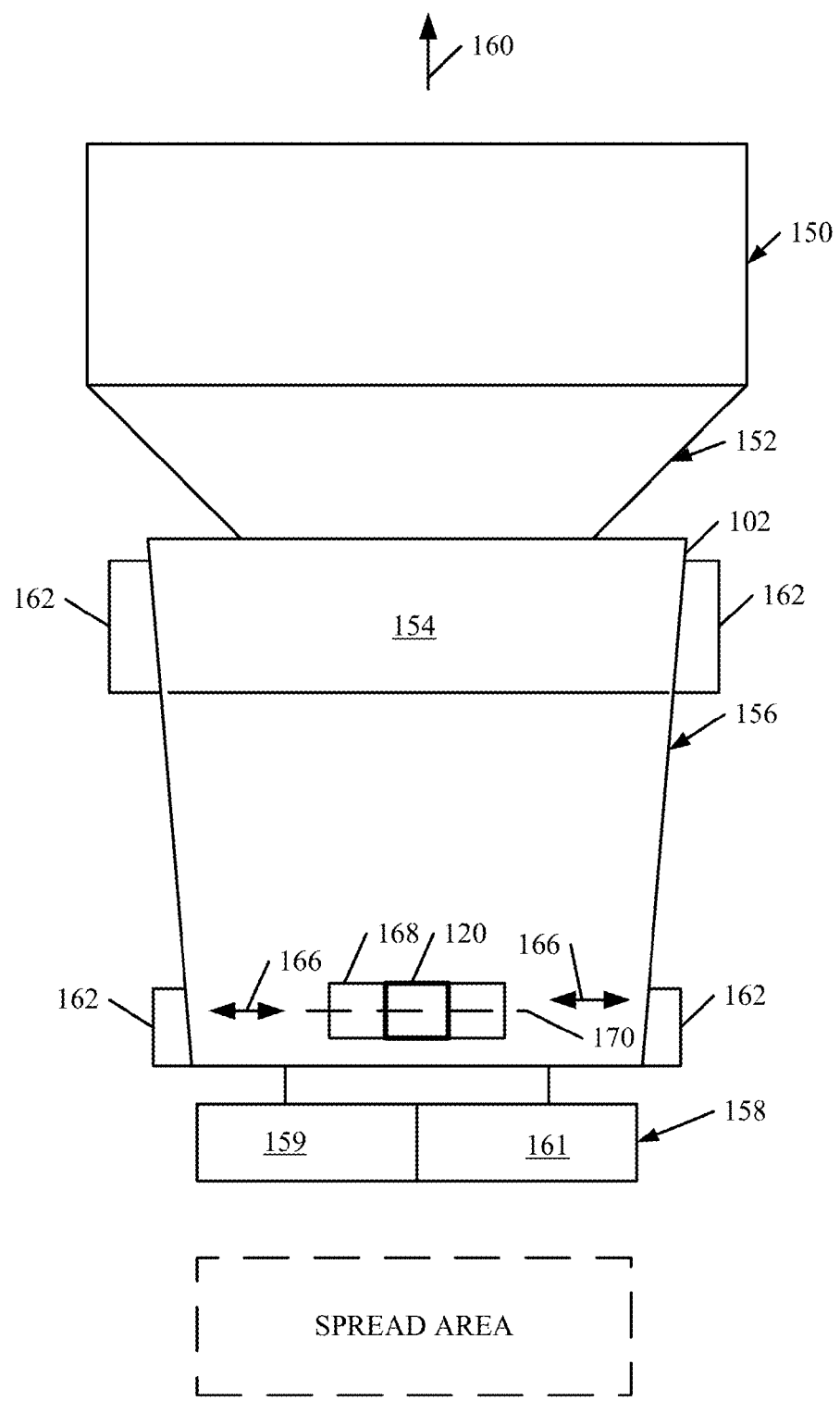
FIG. 2 is a pictorial illustration of a top view of one example of a mobile machine, with a crosswind sensor mounted thereon.

FIG. 2 is a pictorial top view of one example in which mobile machine 102 is a combine. It can be seen that mobile machine 102 illustratively has a header 150, a feeder house 152, an operator compartment 154, a crop processing area 156, and a residue discharge system 158. Combine 102 illustratively travels in a direction of travel generally indicated by arrow 160. Header 150 engages the crop to be processed and feeder house 152 feeds it back to the processing area 156 in combine 102. Combine 102 is illustratively moved by a propulsion system that drives a set of ground-engaging wheels 162.

Residue discharge system 158 can be a wide variety of different types of systems. It illustratively includes direction mechanisms 159 and 161 that can be controlled to direct residue discharge preferentially in one direction or another. Direction mechanisms 159 and 161 can, for instance, include one or more controllable shrouds or baffles that direct the residue in a given, selected direction. In the example discussed herein, the direction mechanisms illustratively include a first spreader 159 and a second spreader 161. Each of the spreaders 159 and 161 are illustratively individually controllable. For example, they can have individually controllable spreader speeds which can be controlled to preferentially spread residue on one side or the other, relative to the direction of travel of combine 102. For instance, if spreader 159 is controlled to spread at a higher speed than spreader 161, then residue will preferentially be spread on the left side as viewed in FIG. 2. Alternatively, if spreader 161 is controlled to operate at a higher speed than spreader 159, then residue will preferentially be spread on the right as viewed in FIG. 2.

The example shown in FIG. 2 also illustrates that crosswind sensor 120 is illustratively disposed on combine 102. In the example shown in FIG. 2, it is disposed on a rear portion of combine 102 so that it is relatively closely proximate residue discharge system 158. It is configured to sense crosswind in the direction indicated by arrows 166 in FIG. 2. In one example, sensor 120 includes a shroud 168 that is elongate in a direction indicated by longitudinal axis 170. Shroud 168 blocks out a large majority of components of wind impinging on machine 102, other than crosswinds that are generally parallel to the longitudinal axis 170 of shroud 168.

Figure 3:
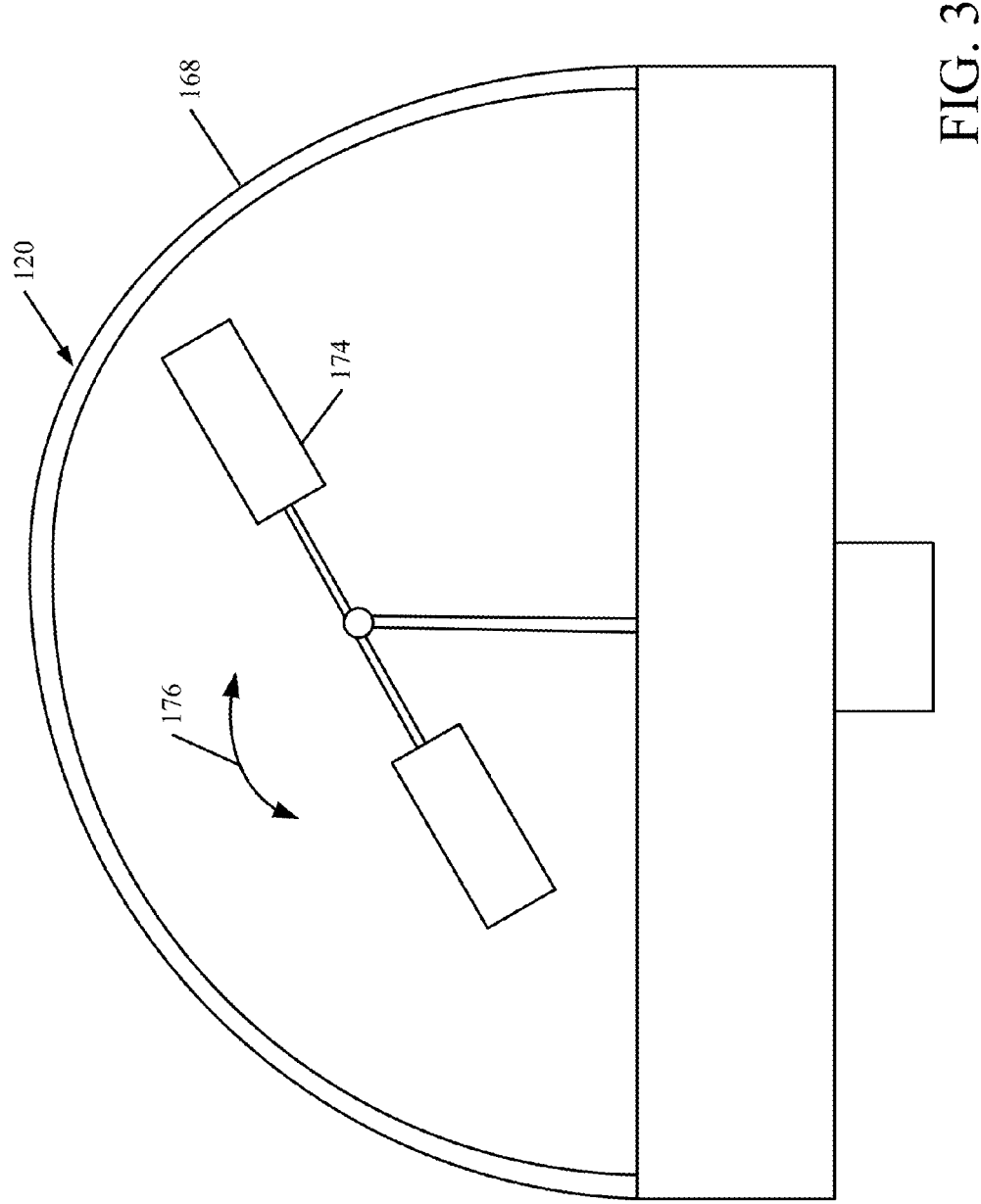
FIG. 3 is a front view of one example of a crosswind sensor.
Figure 4:
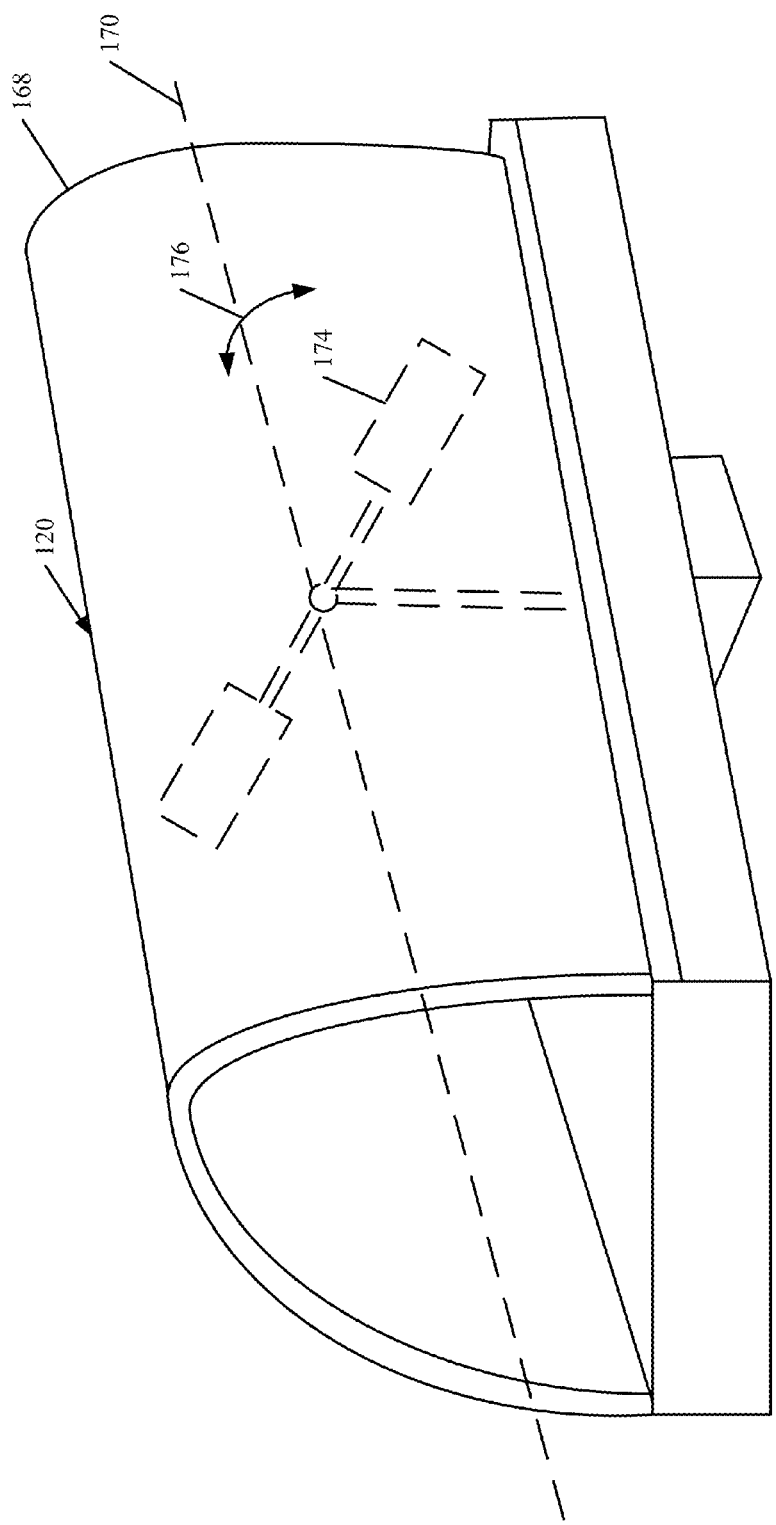
FIG. 4 is an isometric view of one example of a crosswind sensor.

FIG. 3 is a pictorial illustration of one example of a front view of crosswind sensor 120. FIG. 4 is an isometric view of one example of crosswind sensor 120. In the example shown in FIGS. 3 and 4, sensor 120 illustratively includes an impeller 174 that is mounted for rotation in the direction generally indicated by arrow 176. It can be seen that shroud 168 extends along longitudinal axis 170, relative to impeller 174. In one example, it extends by a distance that is sufficient to block at least some, and up to a majority of the wind components, other than the crosswind component that flows in a direction generally parallel to longitudinal axis 170. Thus, shroud 168 can extend along axis 170 by a distance at least as great as the thickness of impeller 174 along axis 170. It can extend further, such as by a distance multiple times greater than the thickness of impeller 174. The length of shroud 168 can also be set based on a diameter of the opening defined by shroud 168, it can be set empirically, or in other ways.

Also, sensor 120 is illustratively rigidly mounted to a structural frame of combine 102 so that axis 170 of shroud 168 is fixed in a direction generally transverse to (or perpendicular to) the direction of travel machine 102. It is mounted so that the relationship of axis 170 relative to the direction of machine travel does not change with wind direction.

Therefore, the crosswind component that blows in a direction generally parallel to axis 170 will impinge on impeller 174 within shroud 168. In one example, impeller 174 is illustratively connected to a brushed DC motor/generator. When the crosswind component blowing in the direction parallel to longitudinal axis 170 varies in speed and direction, this causes impeller 174 to rotate in one of two directions, at a speed that corresponds to the magnitude of the crosswind component. Rotation of impeller 174 illustratively generates a positive or negative voltage of varying magnitude, based on its direction of rotation. This voltage can be used by action signal generator component 134 to generate an action signal based upon the sensed crosswind.

It will be noted that in some examples, the crosswind sensor can be a differential pressure sensor (such as a pitot tube sensor) or another type of sensor that senses substantially only crosswind components of the wind that flows generally parallel to longitudinal axis 170. The sensor shown in FIGS. 3 and 4 is shown for the sake of example only.

Figure 5:
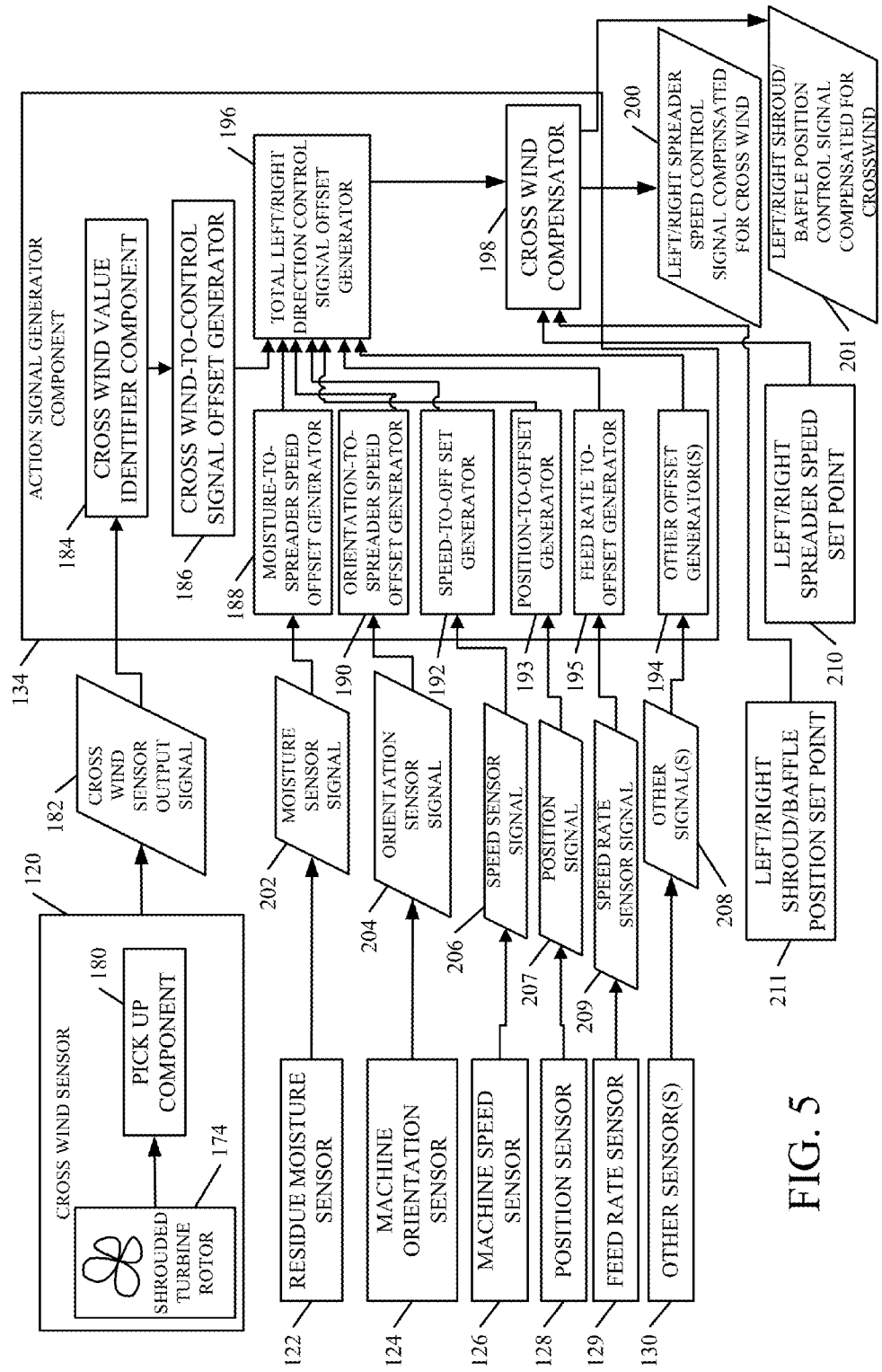
FIG. 5 is a more detailed block diagram of one example of an action signal generator.

FIG. 5 is a more detailed block diagram of one example of crosswind sensor 120 and action signal generator component 134. In the example shown in FIG. 5, crosswind sensor 120 is shown as including a shrouded turbine rotor (or impeller) 174. In the example illustrated, it also includes pickup component 180. In one example, pickup component 180 is illustratively a magnetic pickup that generates a crosswind sensor output signal 182 that is indicative of the speed of rotation of impeller 174, and its direction of rotation. Signal 182, for instance, can be an oscillating signal that has a frequency of oscillation that corresponds to the frequency of rotation of impeller 174. The phase of oscillation can correspond to the direction of rotation of impeller 174. Of course, signal 182 can represent the speed and direction of rotation of impeller 174 in other ways as well.

Action signal generator component 134 illustratively includes crosswind value identifier component 184, crosswind-to-spreader speed offset generator 186, moisture-to-spreader speed offset generator 188, orientation-to-spreader speed offset generator 190, machine speed-to-offset generator 192, position-to-offset generator 193, feed rate-to-offset generator 195, other offset generators 194, total left/right spreader speed offset generator 196, and crosswind compensator 198. In the example shown in FIG. 5, action signal generator component 134 illustratively generates the action signal as left and right spreader speed control signals (or left and right baffle control signals, or both) that are compensated for crosswind, as indicated by blocks 200 and 201.

Crosswind value identifier component 184 identifies a value indicative of the crosswind represented by signal 182. The value can indicate the wind direction and speed (or magnitude). It provides the value to crosswind-to-spreader speed offset generator 186 which generates an offset value that can be used to control the spreader speed of the left and right spreaders (or the direction of left and right shrouds or baffles, or both) to preferentially discharge residue in one direction or the other, based on the crosswind.

In the example shown in FIG. 5, residue moisture sensor 122 also generates a moisture sensor signal 202 that is indicative of the sensed moisture in the residue. Moisture-to-spreader speed offset generator 188 also generates an offset value that can be used to influence the speed of the left and right spreaders (or the direction of the shrouds or baffles), based upon the moisture content of the residue. Machine orientation sensor 124 generates an orientation sensor signal 126 that is provided to orientation-to-spreader speed offset generator 190. Generator 190 can generate an offset that can be used to control the speed of the spreaders (or the direction of the shrouds or baffles) based upon the machine orientation. Machine speed sensor 126 generates sensor signal 206 and provides it to speed-to-offset generator 190 that can generate an offset based upon machine speed. Position sensor 128 generates a position signal 207 that is provided to position-to-offset generator 193. Generator 193 can generate an offset based on machine position. Feedrate sensor 129 generates a feed rate signal 209 which can be indicative of an amount of residue being discharged. Generator 195 can generate an offset based on that. The other sensors 130 can generate a variety of other sensor signals 208 that can be provided to corresponding offset generator 194. Generator 194 can generate offsets to the spreader speed control signals (or the direction of the shrouds or baffles) based upon the other sensed variables.

Total left/right direction control signal offset generator 196 can receive the offset values generated by the various generators 186, 188, 190, 192 and/or 194. It can then generate a total offset that can be used to compensate the speed of operation of the various spreaders (or the position of the discharge baffles), to preferentially spread more residue in one direction or the other, based upon the crosswind, and based upon the other sensed variables. It provides the total offset value to crosswind compensator 198. Crosswind compensator 198 can also receive an input indicative of a current value of the left and right spreader speed set points (or a current value 211 of the position signals controlling direction of the left and right discharge baffles), as indicated by block 210. It can compensate those set points, based upon the total offset value generated by offset generator 196, and generate an action signal indicative of the spreader speed set point signals (or baffle position signals), compensated for crosswind (and any other sensed variables) as indicated by block 200.

Again, the block diagram shown in FIG. 5 is only one example. Others could be used as well. For instance, instead of controlling the operational speed of left and right spreaders (or in addition to it), a baffle system can be used to control the direction of discharge of residue, and the baffle direction can be compensated based upon sensed crosswind (or other variables). Also, a wide variety of other directional mechanisms can be used to control the direction of discharge of residue from the mobile machine, and they can be controlled based upon the sensed crosswind or other sensed variables as well.

Figure 6:
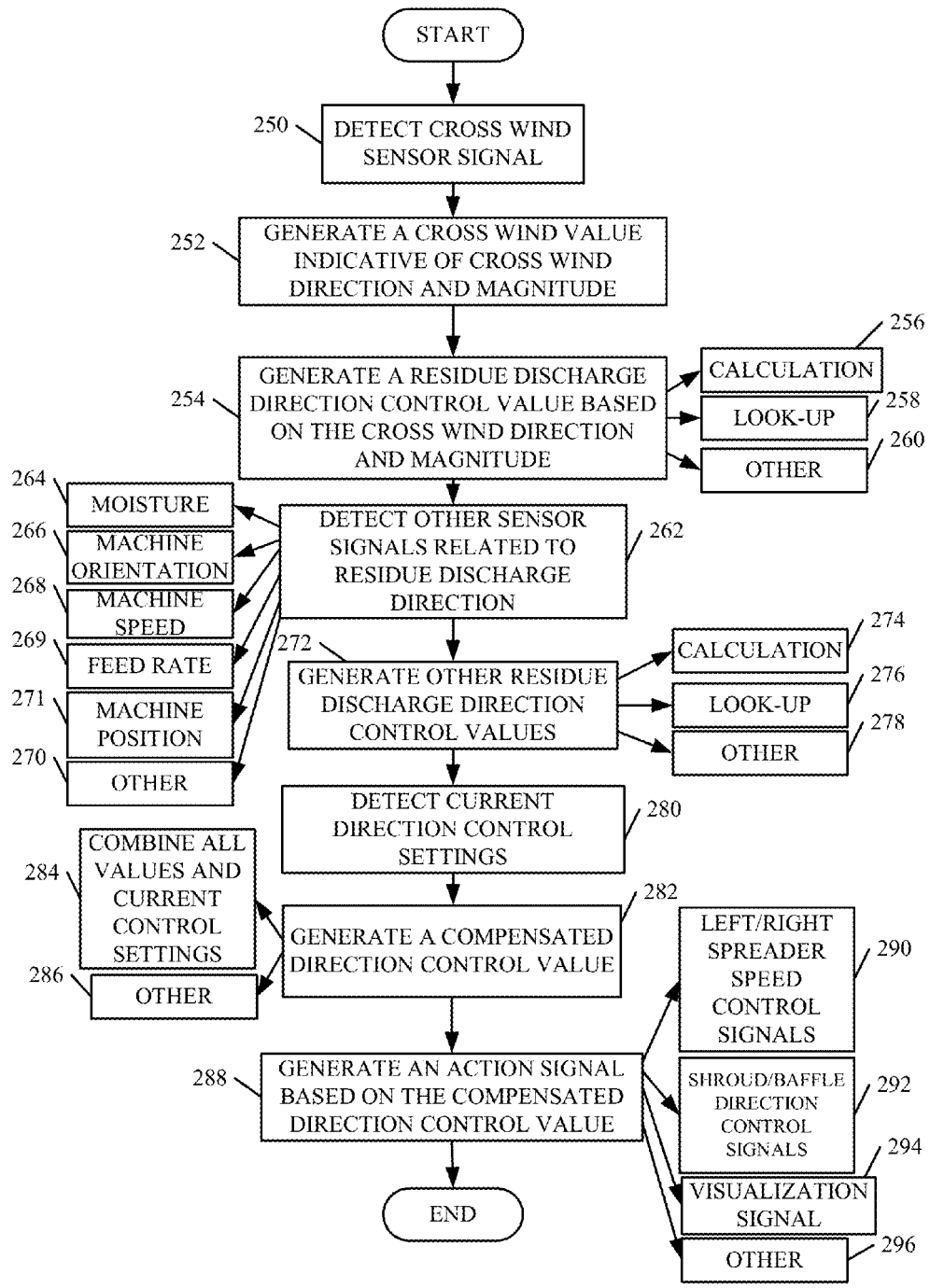
FIG. 6 is a flow diagram illustrating one example of the operation of the architecture shown in FIG. 1 in generating an action signal based on sensed crosswind.

FIG. 6 is a flow diagram illustrating one example of the operation of mobile machine 102, and action signal generator component 134, in generating the action signal based upon sensed crosswind (and other sensed variables). In one example, control system 110 first detects the crosswind sensor signal 182 from crosswind sensor 120. This is indicated by block 250 in FIG. 6. Crosswind value identifier component 184 then generates a crosswind value that is indicative of the direction and magnitude of the crosswind component generally parallel to longitudinal axis 170 of shroud 168. This is indicated by block 252. Offset generator 186 then generates a residue discharge control value based upon the crosswind direction and magnitude. This is indicated by block 254. In one example, this can be a dynamic calculation performed on-the-fly. This is indicated by block 256. It can also be generated using one or more lookup tables or calculations in combination with lookup tables. Performing a lookup operation is indicated by block 258. It can also be generated using a dynamic model or a static model or in other ways. This is indicated by block 260.

In an example where action signal generator component 134 considers other sensed variables, in addition to the crosswind, it detects other sensor signals related to residue discharge direction. This is indicated by block 262. As mentioned in the examples discussed above, these sensor signals can represent residue moisture 264, machine orientation 266, machine speed 268, feed rate 269, machine position 271, and/or a wide variety of other variables 270. Action signal generator component 134 then generates other residue discharge direction control values based upon the other variable parameters that are being considered and for which sensor signals have been received at block 262. Generating the other direction control values is indicated by block 272 in FIG. 6. Again, these can be generated by performing a calculation 274, by performing a lookup operation 276, or in a wide variety of other ways 278.

Action signal generator component 174 then detects any current direction control settings. This is indicated by block 280. For instance, in the example where residue discharge direction is controlled based on the speed of left and right spreaders, it can detect the current set points for controlling the speed of those spreaders. Where it is controlled by another directional control mechanism, it can detect a current setting that controls the direction of such a mechanism.

Component 134 then generates a compensated direction control value, that is compensated for crosswind (and any other sensed variables). This is indicated by block 282. In one example, it does so by combining all of the residue discharge direction control values that were previously calculated, along with the current set points or settings. This is indicated by block 284. It can generate the compensated direction control value in other ways as well, as indicated by block 286.

Action signal generator component 134 then generates an action signal based on the compensated direction control value. This is indicated by block 288. As discussed above, the action signal can be provided in the form of left and right spreader speed control signals. This is indicated by block 290. It can be provided as a baffle direction control signal as indicated by block 292. It can be provided as a visualization signal 294 that generates a visualization that is surfaced for operator 104. It can take a wide variety of other forms as well, and this indicated by block 296.

Figure 7:
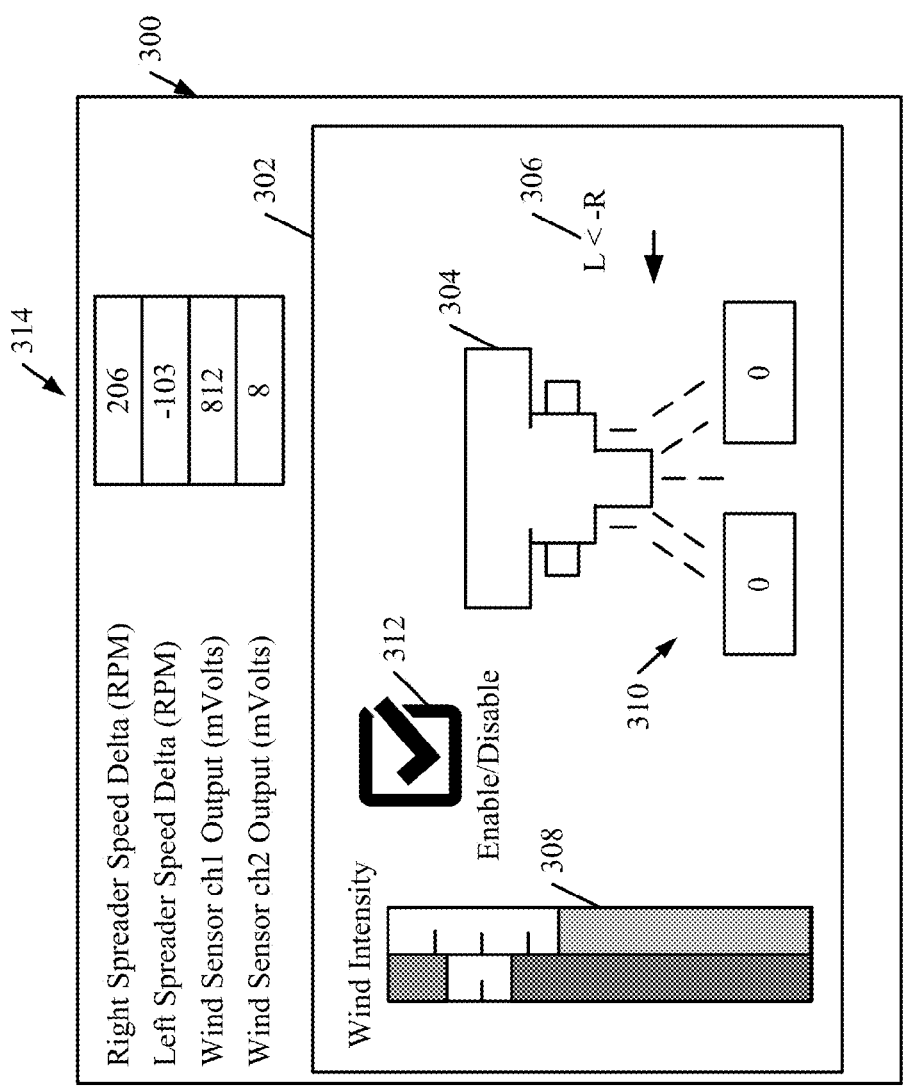
FIG. 7 is one example of a user interface display that can be surfaced.

FIG. 7 shows one example of a visualization 300 that can be surfaced for operator 104 on a suitable user interface mechanism. Visualization 300 illustratively includes a graphic portion 302 that shows a representation 304 of the mobile machine. It also illustratively includes a crosswind direction indicator 306 and a wind intensity indicator 308. It can also illustratively include a discharge indicator 310 that can be used to illustrate whether residue is being preferentially discharged in one direction or the other, relative to machine 304. Further, in one example, an enable/disable user input mechanism 312 is provided that allows the operator 104 to easily enable and disable the crosswind compensation mechanisms described herein.

In the example shown in FIG. 7, visualization 300 also illustratively includes a set of control indicators shown generally at 314. The control indicators can, for instance, show an offset for the left and right spreaders, based upon the detected crosswind. They can show actual sensor signal outputs and a variety of other things. In the example shown in FIG. 7, the spreader speed offsets are displayed in terms of RPM, while the sensor signal outputs are displayed in terms of millivolts. These are examples only.

It will also be noted that visualization 300 can take a wide variety of different forms. The visualization can be color-coded, or it can include animations. Where it is displayed on a touch-sensitive screen, it can enable touch interaction with the user. All of these are contemplated herein.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 8:
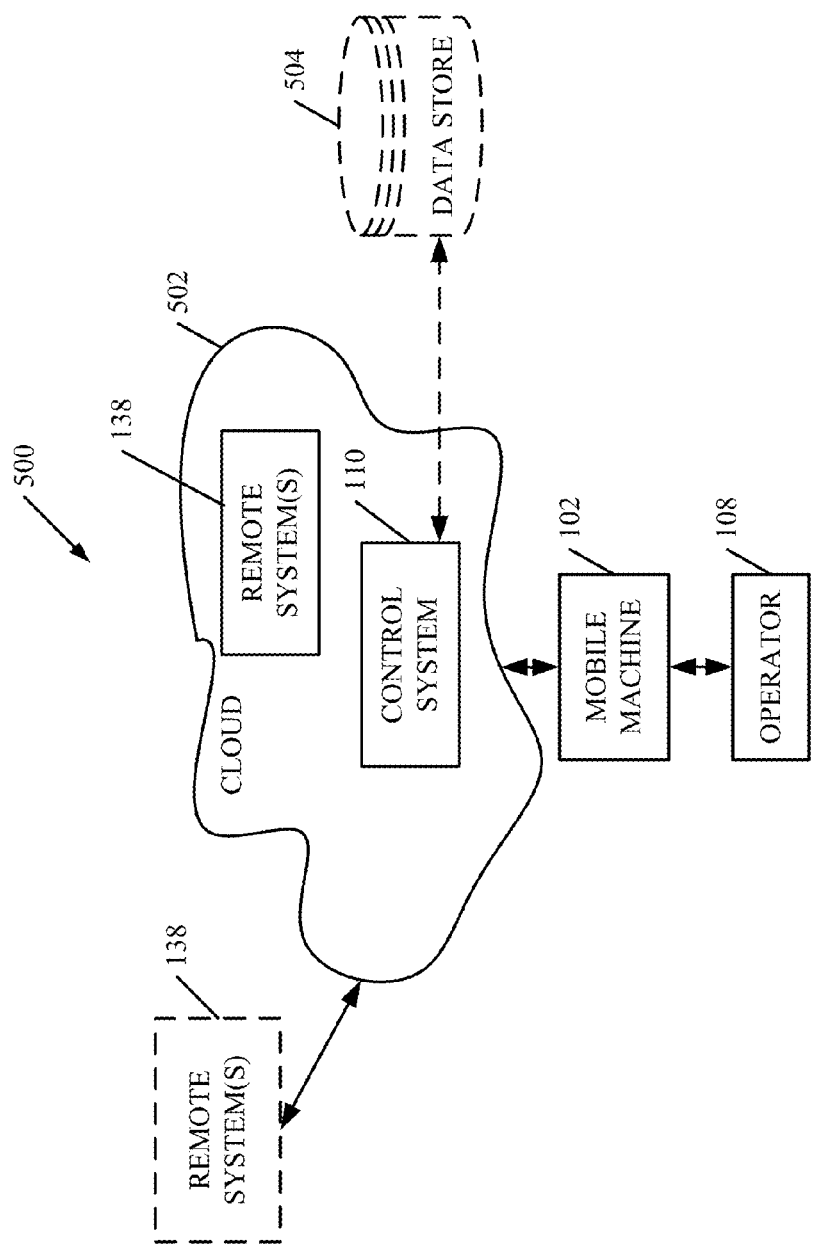
FIG. 8 is one example of how the architecture shown in FIG. 1 can be deployed in a remote server environment.

FIG. 8 is a block diagram of harvester 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in previous figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 1 and they are similarly numbered.

FIG. 8 specifically shows that control system 110 and remote systems 138 can be located at a remote server location 502. Therefore, harvester 102 accesses those systems through remote server location 502.

FIG. 8 also depicts another example of a remote server architecture. FIG. 8 shows that it is also contemplated that some elements of FIG. 1 are disposed at remote server location 502 while others are not. By way of example, remote storage 504 can be used to store information provided by harvester 102. Also, remote system 138 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
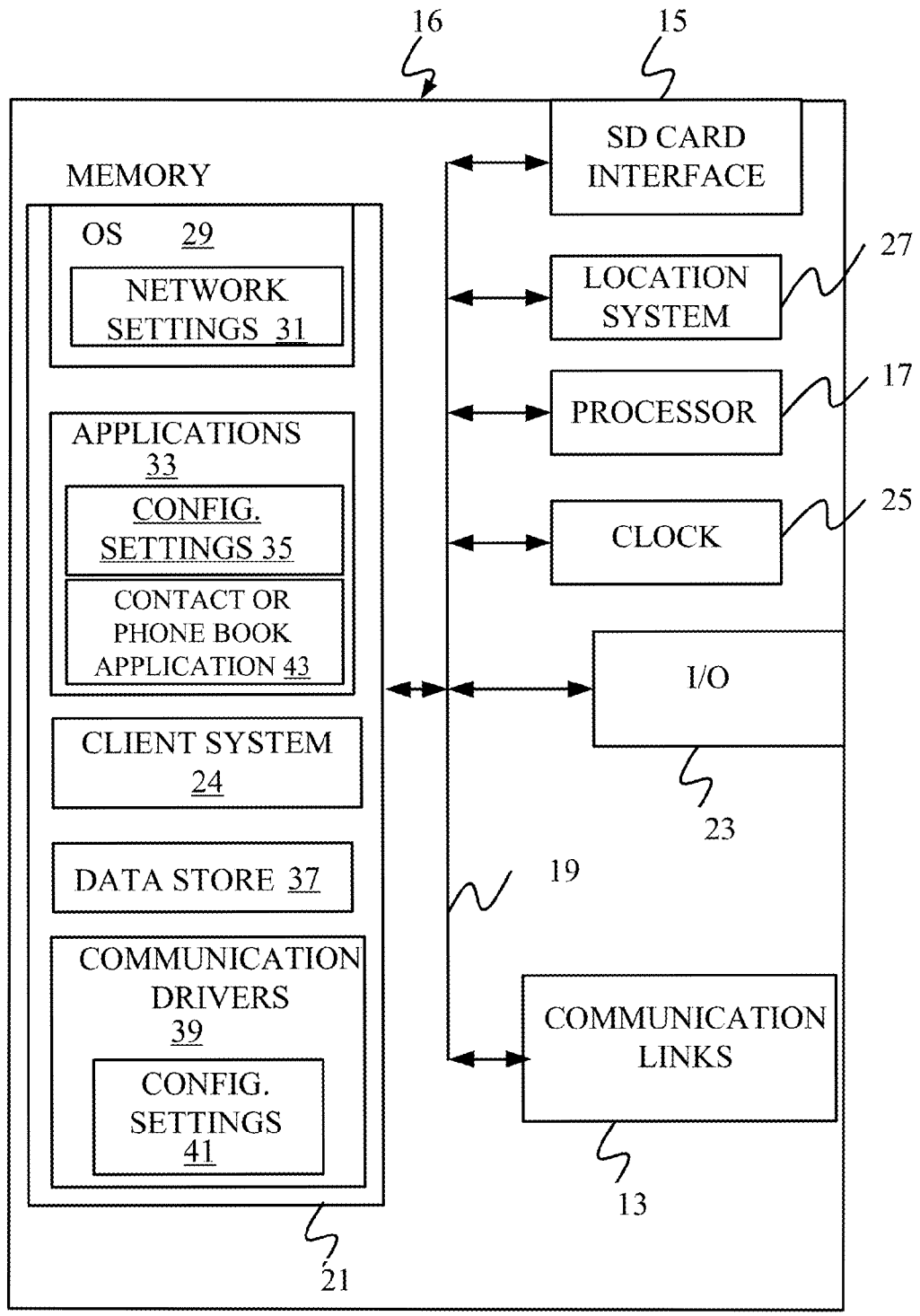
FIGS. 9-11 show examples of mobile devices that can be used in the architecture of the previous figures.
Figure 10:
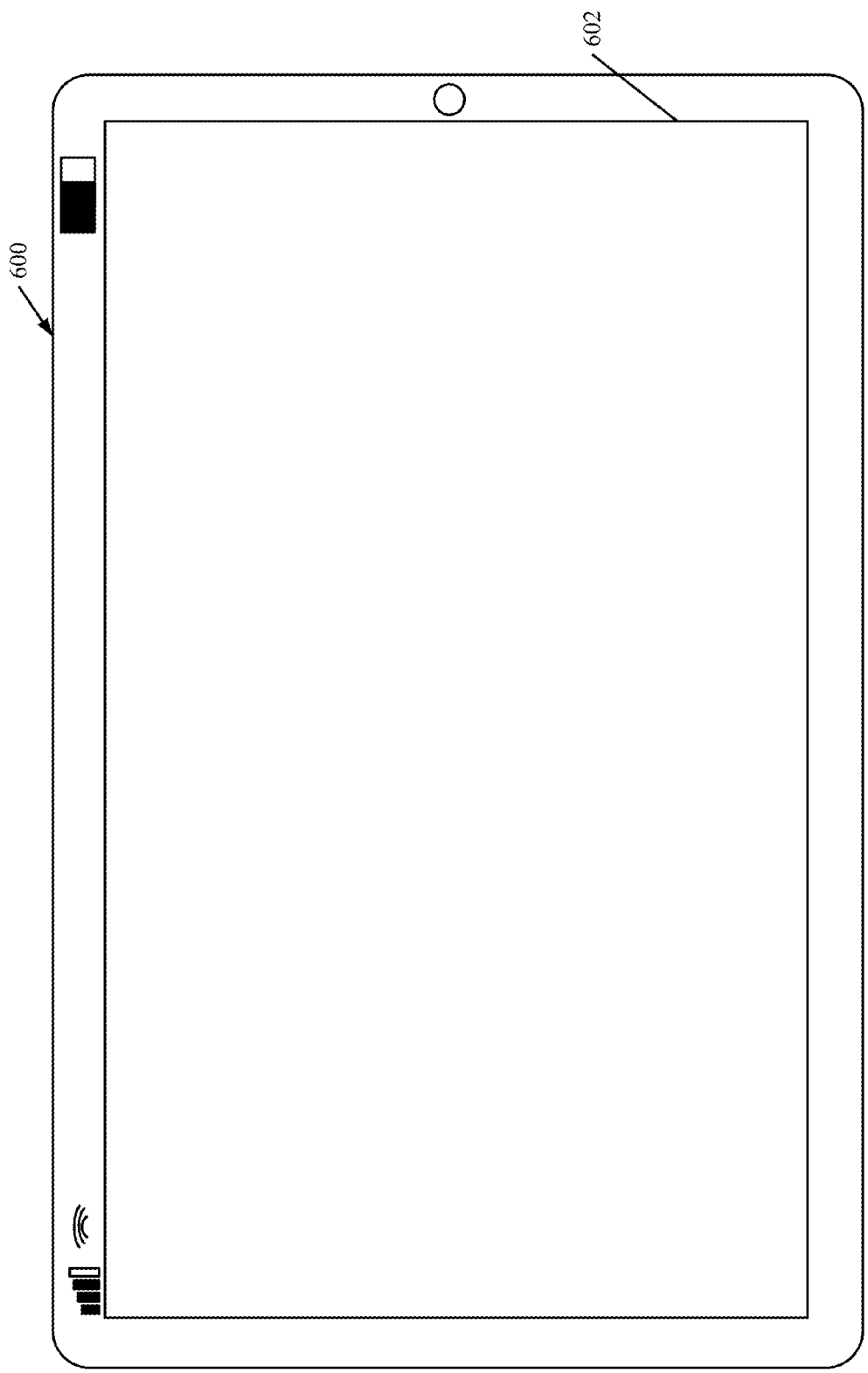
Figure 11:
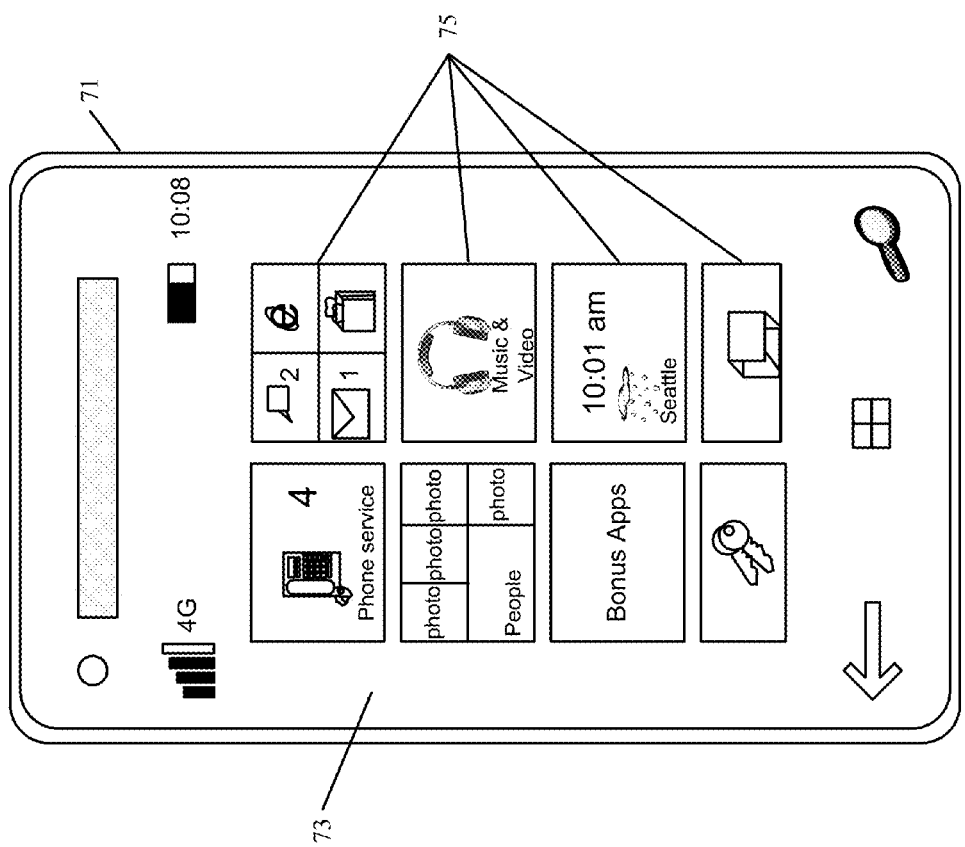

FIG. 9 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 102 for use in generating, processing, or displaying the crosswind compensator data or other data. FIGS. 10-11 are examples of handheld or mobile devices.

FIG. 9 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one embodiment in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
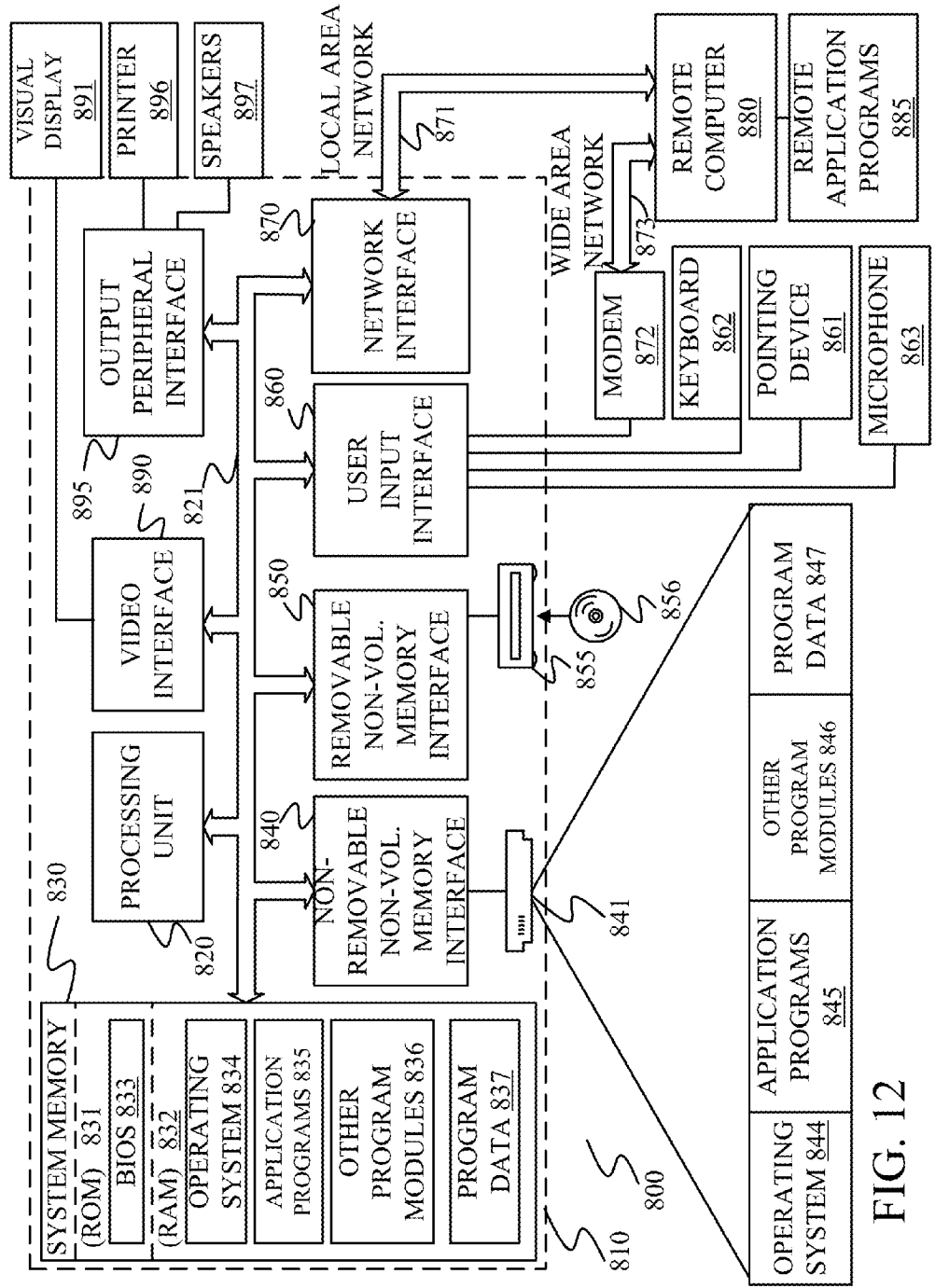
FIG. 12 is a block diagram of one example of a computing environment that can be used in the architectures shown in the previous figures.

FIG. 12 is one example of a computing environment in which elements of FIG. 1, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from other Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a lever, steering wheel, foot pedal, buttons, switches, joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine, comprising:
a structural frame;
a material processing system that engages material to be processed as the mobile machine travels in a direction of travel, processes the material, and generates residue;
a wind sensor, connected to the structural frame, that generates a wind sensor signal indicative of a wind speed and wind direction of air flow impinging on the wind sensor;
an elongate shroud, having a longitudinal axis fixedly oriented generally transverse to the direction of travel of the mobile machine, disposed about the wind sensor; and
an action signal generator, configured to receive the wind sensor signal and generate an action signal related to the residue, based on the wind sensor signal.

Example 2 is the mobile machine of any or all previous examples and further comprising:
a residue discharge system that discharges the residue from the mobile machine; and
a residue discharge control system configured to receive the action signal and control the residue discharge system based on the action signal.

Example 3 is the mobile machine of any or all previous examples wherein the residue discharge system includes a discharge direction mechanism that controls a direction in which the residue discharge system discharges the residue.

Example 4 is the mobile machine of any or all previous examples wherein the residue discharge control system controls the residue discharge system to preferentially discharge the residue in a given direction based on the action signal.

Example 5 is the mobile machine of any or all previous examples wherein the mobile machine comprises a combine and wherein the residue discharge system comprises:
a first spreader, rotatably mounted on a first side of the combine, that rotates to spread the residue; and
a second spreader, rotatably mounted on a second side of the combine, that rotates to spread the residue.

Example 6 is the mobile machine of any or all previous examples wherein the residue discharge control system controls a speed of rotation of the first and second spreaders based on the action signal.

Example 7 is the mobile machine of any or all previous examples and further comprising:
a residue moisture sensor that generates a moisture signal indicative of a moisture of the residue, the action signal generator generating the action signal based on the moisture signal.

Example 8 is the mobile machine of any or all previous examples and further comprising:
a machine orientation sensor that generates an orientation signal indicative of an orientation of the mobile machine, the action signal generator generating the action signal based on the orientation signal.

Example 9 is the mobile machine of any or all previous examples and further comprising:
a machine speed sensor that generates a speed signal indicative of a travel speed of the mobile machine, the action signal generator generating the action signal based on the speed signal.

Example 10 is the mobile machine of any or all previous examples and further comprising:
a user interface component that surfaces indicia indicative of operation of the discharge control system based on the action signal and indicative of the wind speed and wind direction.

Example 11 is a mobile machine, comprising:
a structural frame;
a material processing system that engages material to be processed as the mobile machine travels in a direction of travel, processes the material, and generates residue;
a residue discharge system that discharges the residue from the mobile machine;
a wind sensor connected to the structural frame that generates a wind sensor signal, indicative of a wind speed and wind direction of air flow impinging on the wind sensor;
an additional sensor that senses generates an additional sensor signal indicative of a variable that affects a direction in which the residue is discharged from the mobile machine;
an action signal generator, configured to receive the wind sensor signal and the additional sensor signal and generate an action signal, based on the wind sensor signal and the additional sensor signal; and
a direction control system that controls a direction in which the residue discharge system discharges the residue from the mobile machine, based on the action signal.

Example 12 is the mobile machine of any or all previous examples wherein the additional sensor comprises:
a residue moisture sensor that generates a moisture signal indicative of a moisture of the residue.

Example 13 is the mobile machine of any or all previous examples wherein the additional sensor comprises:
a machine orientation sensor that generates an orientation signal indicative of an orientation of the mobile machine.

Example 14 is the mobile machine of any or all previous examples wherein the additional sensor comprises:
a machine speed sensor that generates a speed signal indicative of a travel speed of the mobile machine.

Example 15 is the mobile machine of any or all previous examples wherein the wind sensor comprises:
an impeller; and
an elongate shroud, having a longitudinal axis fixedly oriented generally transverse to the direction of travel of the mobile machine, disposed about the impeller; and
a pickup component that senses a speed and direction of rotation of the impeller and generates the wind sensor signal indicative of the sensed speed and direction of rotation.

Example 16 is the mobile machine of any or all previous examples wherein the mobile machine comprises a combine and wherein the residue discharge system comprises:
a first spreader, rotatably mounted on a first side of the combine, that rotates to spread the residue; and
a second spreader, rotatably mounted on a second side of the combine, that rotates to spread the residue.

Example 17 is the mobile machine of claim 16 wherein the direction control system controls a speed of rotation of the first and second spreaders based on the action signal.

Example 18 is a method of controlling an agricultural mobile machine, comprising:
detecting a wind speed and wind direction of a cross wind component of air flow, moving in a direction generally transverse to a direction of travel of the agricultural mobile machine;
generating a wind sensor signal, indicative of the detected wind speed and wind direction of the cross wind component of air flow;
detecting an additional variable that affects a direction in which residue is discharged from the mobile machine;
generating an additional sensor signal indicative of the additional variable;
generating an action signal, based on the wind sensor signal and the additional sensor signal; and
controlling a direction in which residue is discharged from the mobile machine, based on the action signal.

Example 19 is the method of any or all previous examples wherein the mobile machine includes a first residue spreader, rotatably mounted on a first side of the mobile machine, that rotates to spread the residue, and a second residue spreader, rotatably mounted on a second side of the mobile machine, that rotates to spread the residue, and wherein controlling a direction comprises:
controlling a speed of rotation of the first and second spreaders based on the action signal.

Example 20 is the method of any or all previous examples wherein detecting an additional variable comprises:
detecting at least one of a moisture of the residue, an orientation of the mobile machine, or a travel speed of the mobile machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
a material processing system that engages material to be processed as the mobile machine travels in a direction of travel;
a wind sensor, connected to a structural frame of the mobile machine that generates a wind sensor signal indicative of a wind speed and wind direction of air flow impinging on the wind sensor;
an elongate shroud, having a longitudinal axis fixedly oriented generally transverse to the direction of travel of the mobile machine, disposed about the wind sensor; and
an action signal generator, configured to receive the wind sensor signal and generate an action signal, based on the wind sensor signal.

2. The mobile machine of claim 1 and further comprising:
a residue discharge system that discharges residue from the mobile machine; and
a residue discharge control system configured to receive the action signal and control the residue discharge system based on the action signal.

3. The mobile machine of claim 2 wherein the residue discharge system includes a discharge direction mechanism that controls a direction in which the residue discharge system discharges the residue.

4. The mobile machine of claim 3 wherein the residue discharge control system controls the residue discharge system to preferentially discharge the residue in a given direction based on the action signal.

5. The mobile machine of claim 4 wherein the mobile machine comprises a combine and wherein the residue discharge system comprises:
a first spreader, rotatably mounted on a first side of the combine, that rotates to spread the residue; and
a second spreader, rotatably mounted on a second side of the combine, that rotates to spread the residue.

6. The mobile machine of claim 5 wherein the residue discharge control system controls a speed of rotation of the first and second spreaders based on the action signal.

7. The mobile machine of claim 4 wherein the discharge direction mechanism comprises a baffle system that is oriented in a direction based on a direction setting, the residue discharge control system and controlling the direction setting to control the direction in which the residue is discharged.

8. The mobile machine of claim 4 and further comprising:
a residue moisture sensor that generates a moisture signal indicative of a moisture of the residue, the action signal generator generating the action signal based on the moisture signal.

9. The mobile machine of claim 4 and further comprising:
a machine orientation sensor that generates an orientation signal indicative of an orientation of the mobile machine, the action signal generator generating the action signal based on the orientation signal.

10. The mobile machine of claim 4 and further comprising:
a machine speed sensor that generates a speed signal indicative of a travel speed of the mobile machine, the action signal generator generating the action signal based on the speed signal.

11. The mobile machine of claim 4 and further comprising:
a feed rate sensor that generates a feed rate signal indicative of a reside discharge rate.

12. The mobile machine of claim 2 and further comprising:
a user interface component that surfaces indicia indicative of operation of the residue discharge control system based on the action signal and indicative of the wind speed and wind direction.

13. A mobile machine, comprising:
a structural frame;
a material processing system that engages material to be processed as the mobile machine travels in a direction of travel, processes the material, and generates residue;
a residue discharge system that discharges the residue from the mobile machine;
a wind sensor connected to the structural frame that generates a wind sensor signal, indicative of a wind speed and wind direction of air flow impinging on the wind sensor;
an additional sensor that generates an additional sensor signal indicative of a variable that affects a direction in which the residue is discharged from the mobile machine;
an action signal generator, configured to receive the wind sensor signal and the additional sensor signal and generate an action signal, based on the wind sensor signal and the additional sensor signal; and
a direction control system that controls a direction in which the residue discharge system discharges the residue from the mobile machine, based on the action signal.

14. The mobile machine of claim 13 wherein the wind sensor comprises:
an impeller; and
an elongate shroud, having a longitudinal axis fixedly oriented generally transverse to the direction of travel of the mobile machine, disposed about the impeller; and
a pickup component that senses a speed and direction of rotation of the impeller and generates the wind sensor signal indicative of the sensed speed and direction of rotation.

15. The mobile machine of claim 14 wherein the mobile machine comprises a combine and wherein the residue discharge system comprises:
a first spreader, rotatably mounted on a first side of the combine, that rotates to spread the residue; and
a second spreader, rotatably mounted on a second side of the combine, that rotates to spread the residue.

16. The mobile machine of claim 15 wherein the direction control system controls a speed of rotation of the first and second spreaders based on the action signal.

17. The mobile machine of claim 14 wherein the mobile machine comprises a combine with a controllable baffle system that controls the direction in which the residue is discharged, the direction control system controlling the baffle system based on the action signal.

18. A method of controlling an agricultural mobile machine, comprising:
detecting a wind speed and wind direction of a cross wind component of air flow, moving in a direction generally transverse to a direction of travel of the agricultural mobile machine;
generating a wind sensor signal, indicative of the detected wind speed and wind direction of the cross wind component of air flow;

detecting an additional variable that affects a direction in which residue is discharged from the mobile machine;

generating an additional sensor signal indicative of the additional variable;

generating an action signal, based on the wind sensor signal and the additional sensor signal; and controlling a direction in which residue is discharged from the mobile machine, based on the action signal.

19. The method of claim 18 wherein the mobile machine includes a first residue spreader, rotatably mounted on a first side of the mobile machine, that rotates to spread the residue, and a second residue spreader, rotatably mounted on a second side of the mobile machine, that rotates to spread the residue, and wherein controlling a direction comprises:

controlling a speed of rotation of the first and second spreaders based on the action signal.

20. The method of claim 18 wherein detecting an additional variable comprises:

detecting at least one of a moisture of the residue, an orientation of the mobile machine, or a travel speed of the mobile machine.

\* \* \* \* \*